Figure 1:
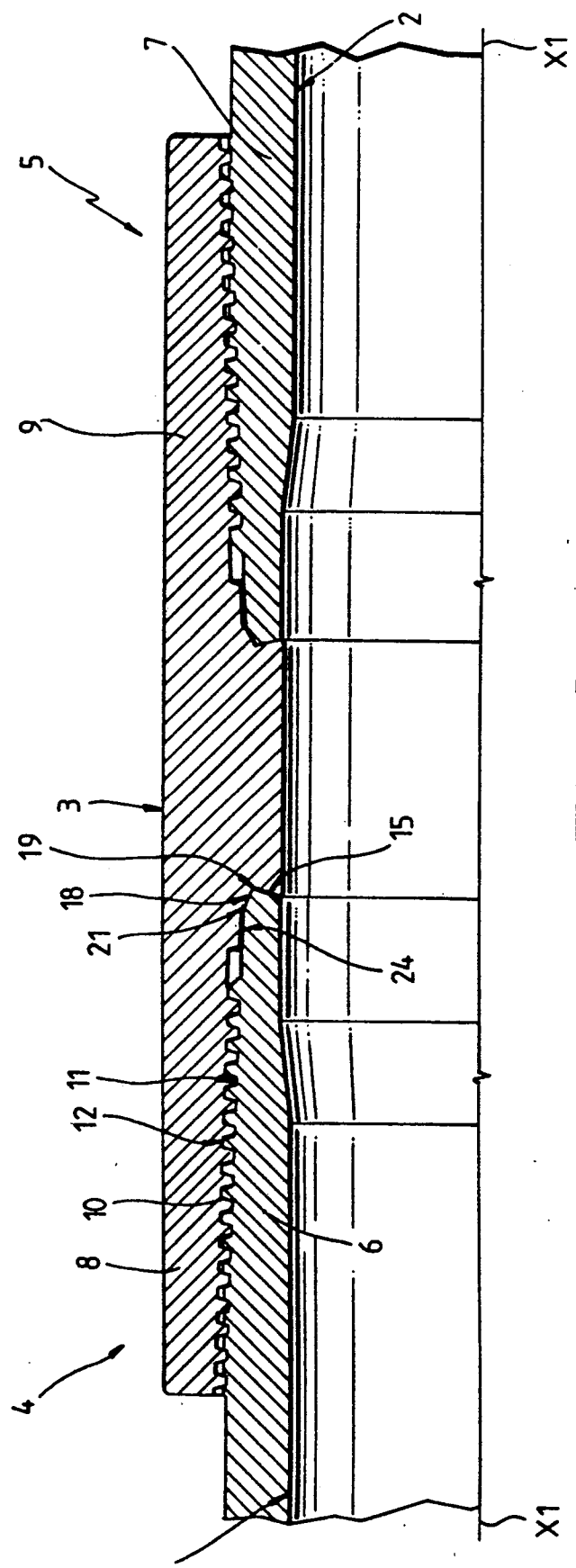

United States Patent [19]

Noel et al.

[11] Patent Number: 5,137,310

[45] Date of Patent: Aug. 11, 1992

[54] ASSEMBLY ARRANGEMENT USING FRUSTOCONICAL SCREWTHREADS FOR TUBES

[75] Inventors: Thierry Noel, Sebourg, France; Shigeo Nagasaku, Nishinomiya, Japan

[73] Assignees: Vallourec Industries, Boulogne-Billancourt, France; Sumitomo Metal Industries, Osaka, Japan

[21] Appl. No.: 618,684

[22] Filed: Nov. 27, 1990

[51] Int. Cl.$^5$ .............................................. F16L 25/00
[52] U.S. Cl. .................................... 285/333; 285/383
[58] Field of Search ............... 285/334, 333, 355, 390, 285/383

[56] References Cited

U.S. PATENT DOCUMENTS

| | | | |
|---|---|---|---|
| 4,629,224 | 12/1986 | Landriault | 285/334 |
| 4,795,200 | 1/1989 | Tung | 285/334 |
| 4,828,295 | 5/1989 | Plaquin et al. | 285/334 |

FOREIGN PATENT DOCUMENTS

| | | | |
|---|---|---|---|
| 1489013 | 7/1967 | France | 285/334 |

*Primary Examiner*—Dave W. Arola
*Attorney, Agent, or Firm*—Arnold, White & Durkee

[57] ABSTRACT

The assembly arrangement according to the invention concerns the tubes which are used primarily in oil industry installations. It permits the sealing assembly of a male end to a female end, each provided with frustoconical screwthreads.

The end region of the male component comprises a convex frustoconical sealing surface for providing a metal-metal sealing connection with a surface of the female component, the internal edge of which is connected to the concave frustoconical abutment region and the external edge of which is connected to the external surface of the end region, having a portion parallel to the generatrix which is tangential to the bottom of the threads of the male screwthread. The diameter of the external edge is such that the prolongation of the generatrix which is tangential to the thread bottoms of the male screwthread passes beyond said external edge.

Use for the assembly of tubes with male ends by means of female sleeves.

9 Claims, 2 Drawing Sheets

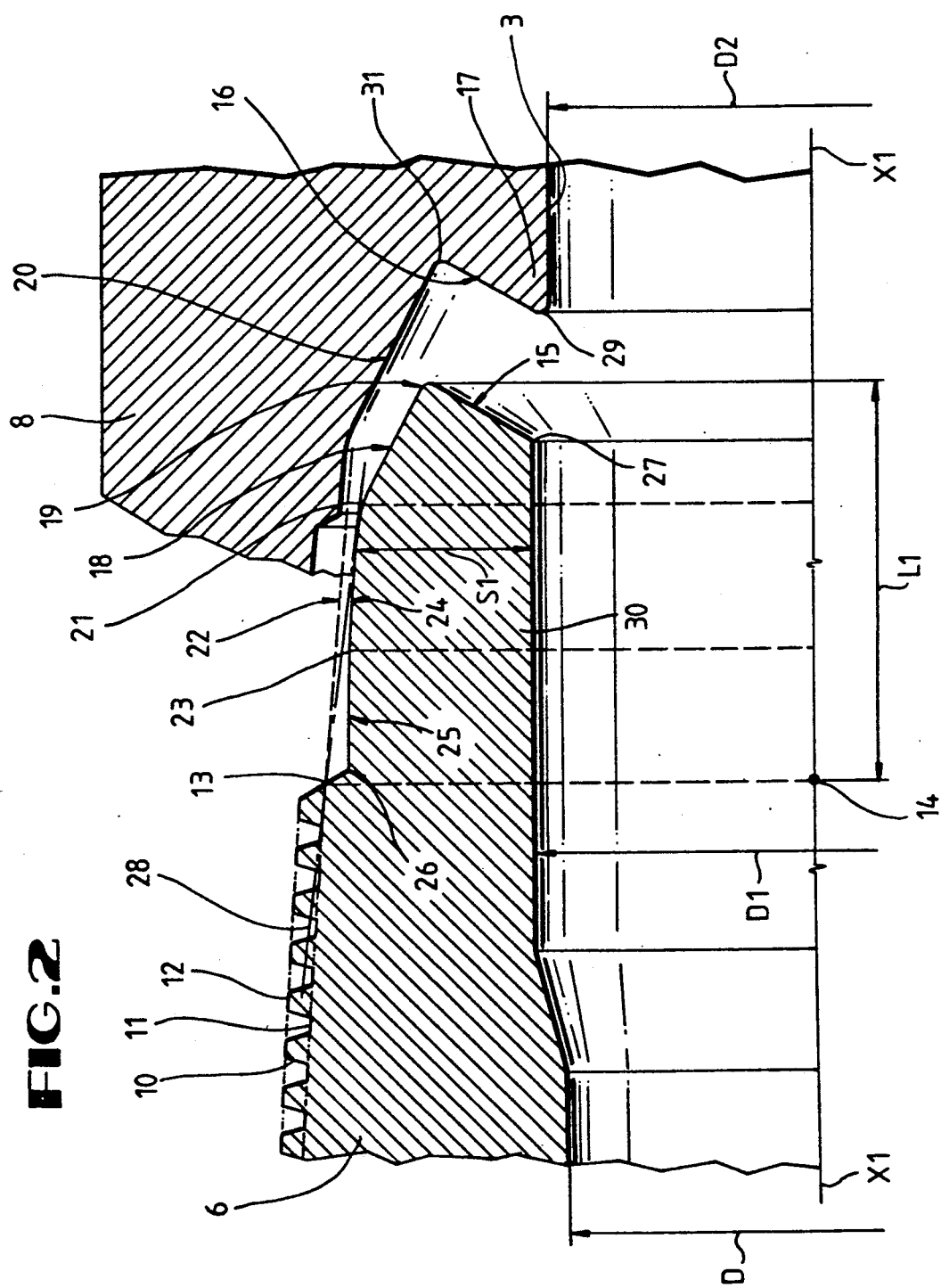

ASSEMBLY ARRANGEMENT USING FRUSTOCONICAL SCREWTHREADS FOR TUBES

The assembly arrangement using frustoconical screwthreads which is the subject-matter of the present invention concerns the assembly of metal tubes for producing strings or lines of tubes and in particular those which are referred to as a "casing" or "tubing", which are used in oil industry installations.

The use of arrangements for the assembly of tubes comprising frustoconical screwthreads for producing such strings or lines of tubes has long been known. Thus French patent No. 1 489 013 describes a joint which permits the sealing assembly of metal tubes by means of frustoconical screwthreads which are provided on the ends of the tubes. Sealing integrity for that joint is achieved by a concave frustoconical surface 3 (see FIG. 3 of that patent) which forms the end of the male component of the joint coming to bear at the end of the screwing operation against a shoulder configuration 7 of a corresponding convex frustoconical shape which is provided on the female component, the male end thus being urged outwardly to permit a metal-to-metal seal to be produced. In a complementary fashion, the convex frustoconical shoulder configuration on the female component is prolonged over its external periphery by a concave frustoconical surface 8 against which the external edge of a concave frustoconical surface of the male element comes to bear. That external edge 4a may comprise a slight convex frustoconical chamfer which comes to bear against the same concave frustoconical surface 8 of the female component.

It is known moreover that the contour of the screwthreads of the male and female components of such a joint, after screwing and tightening thereof, comprises surfaces which are very firmly applied against each other and other surfaces involving a clearance between them so that there is a helical leakage path extending over the entire length of the screwthread.

Experience has shown that, in the course of assembly of strings or lines of tubes involving assembly arrangements using frustoconical screwthreads of the type which has just been described above, it is very often difficult to avoid localised frictional phenomema and/or impacts between the front ends of the male components of those arrangements and the side walls of the female components within which they are engaged. The above-mentioned localised frictional phenomena and/or impacts are frequently the cause of local defects which then give rise to minor localised leakages. In many cases, when strings of tubes of substantial length, which are produced in that way, are subjected to a tensile loading, that results in the occurrence of leaks which will only partially close up when the tensile stress is removed. Successive tension-compression cycles will have particularly adverse consequences on sealing integrity and will cause the development of the leaks which are created in that way.

Research has been carried on into the possibility of providing an assembly arrangement using frustoconical screwthreads, permitting the production of strings of tubes enjoying excellent sealing integrity. Research has also been carried on into the possibility of avoiding the creation of grease pressure when assembling/tightening the assembly arrangement in question. Thus, an attempt has been made to provide for discharge of the excess of lubricating mixture such as for example the "compound grease" mixture which is in conformity with the API specifications, in order thus to make it possible to provide a sufficient tightening effect and a sufficient contact pressure for the screwed arrangement.

Also the attempt has been made to provide an assembly arrangement for tubes, the sealing integrity of which is not altered by the use in the assembling/tightening operation of an amount of grease which is surplus to requirements (overdoping).

More particularly research has been carried on into the possibility of providing an assembly arrangement using frustoconical screwthreads, in which there is no risk of its sealing integrity being compromised by localised frictional phenomena or impacts which occur in the course of the operation of introducing the male component into the female component.

An attempt has also been made to provide an assembly arrangement for tubes in which the sealing integrity thereof is not affected by the metal particles contained in the "compound grease", those metal particles having a tendency to create between the contact surfaces which provide the sealing integrity, leakage paths which are not closed up by the other components or said grease.

An attempt has also been made to provide an assembly arrangement in which the sealing integrity thereof would not run the risk of being compromised by one or more compression-tension cycles applied to long string or lines of tubes provided with such assembly arrangements.

An attempt has also been made to provide an assembly arrangement using frustconical screwthreads for such strings or lines of tubes, permitting a plurality of disassembly and re-assembly operations without losing sealing integrity.

Finally, an attempt has been made to provide an assembly arrangement using frustoconical screwthreads, for assembling either two relatively long tubes, that length being in most cases several metres, one of the tubes comprising an end provided with a male screwthread and the other end provided with a corresponding female screwthread, or two relatively long tubes each comprising at each end a male screwthread with the interposition between the two of a short tube forming a connecting sleeve and provided at its two ends with female screwthreads corresponding to the male screwthreads. When using a connecting sleeve or a similar device, the assembly arrangement, in an alternative configuration, may comprise two relatively long tubes each comprising at each end a female screwthread with the interposition between the two of a relatively short tube forming a connecting sleeve and provided at its two ends with male screwthreads corresponding to the female screwthreads.

The assembly arrangement using frustoconical screwthreads, which is the subject-matter of the present invention, makes it possible to attain the results being sought.

The assembly arrangement comprises a male component comprising an external male frustoconical screwthread provided in an end region of a tubular element and a female component comprising a corresponding internal female frustoconical screwthread provided in an end region of another tubular element which is to be assembled to the first tubular element. Each of the two tubular elements may be a tube of greater or lesser length or a tube of short length which can perform the function of a connecting sleeve. Generally, when using a sleeve, it comprises female screwthreads at its two ends. The front end of the male component comprises a concave frustoconical abutment surface capable of coming to bear against a convex frustoconical bearing surface formed on a shoulder configuration of the wall of the female component. The external edge of the concave frustoconical abutment surface is connected to a convex frustoconical sealing surface of the same male component, which is capable of coming to bear against a corresponding concave frustoconical surface of the female component which is connected to the convex frustoconical bearing surface of said component.

In accordance with the invention, the external edge of the frustoconical sealing surface of the male component is of a diameter such that the prolongation of the generatrix of the truncated cone which is tangential to the thread bottoms of the male screwthread passes beyond said external edge and preferably at a distance which is at least equal to 0.1 mm from said external edge, said distance advantageously being between 0.1 and 0.5 mm, the half-angle at the apex of the frustoconical sealing surface of the male end being in all cases greater than the angle between the axis of the tube and the straight line joining the end of the male screwthread at the point of small diameter to the external edge of the frustoconical sealing surface.

Moreover the portion of the generatrix of the external surface of the end region of the male component, which is between the external edge of the frustoconical sealing surface and the small-diameter end of the screwthread, forms an angle with the generatrix of the sealing surface but does not intersect the prolongation of the generatrix of the truncated cone which is tangential to the thread bottoms of the screwthread of the male component and comprises a portion which is parallel or substantially parallel to the prolongation of the generatrix of the truncated cone which is tangential to the male thread bottoms constituting a frustoconical guide surface.

That configuration thus eliminates any risk of damaging the convex frustoconical sealing surface of the male component when said male component is engaged into the female component as a result of localised frictional phenomena and/or impacts between said frustoconical surface and the screwthreaded wall of the female component.

The relative positions of the corresponding abutment and bearing surfaces and those of the corresponding sealing surfaces of the male and female components are so determined that, in the course of tightening the screwed screwthreads of the two components, the pressure exerted between them by the abutment and bearing surfaces gives rise to increased clamping of the sealing surfaces against each other by virtue of the radial component of the tightening force which results from the inclination of those frustoconical surfaces. Thus the metal to metal contact of the sealing surfaces against each other provides the sealing integrity of the assembly arrangement. Preferably, after the screwed assembly has been made up, with the abutment surface and the bearing surface being brought into contact with each other and tightened together, the length of the generatrix of the contact surface between the convex and concave frustoconical sealing surfaces is at least equal to 2 mm. Preferably the half-angle at the apex of the convex and concave frustoconical sealing surfaces is between 2.862° and 30°. Preferably also the half-angle at the apex of the concave and convex frustoconical abutment and bearing surfaces is between 70 and 85°.

Advantageously the distance between the external edge of the abutment surface of the male component and the small-diameter end of its screwthread, as measured parallel to the axis of said component, is at least equal to 8 mm for tubes with an outside diameter of from 120 to 250 mm.

Advantageously the generatrix of the portion forming the convex frustoconical guide surface is connected to the generatrix of the convex frustoconical sealing surface at the location of its external edge by a rounded portion with a radius which is preferably at least equal to 3 mm.

Moreover the male and female screwthreads are preferably dimensioned so that an interference takes place between the threaded portions providing a contact pressure between the male screwthread and the female screwthread and this preferably before the male sealing surface comes into contact with the corresponding female sealing surface.

The generatrix of the external surface of the end region of the male component may comprise, beyond the portion corresponding to the frustoconical guide surface, a substantially cylindrical surface portion whose generatrix which is parallel to the axis of the male component is connected by way of a connecting surface to the small-diameter end of the screwthread.

The length of the generatrix of the concave frustoconical abutment surface of the male component is so dimensioned that the metal does not undergo plastic deformation in that region in the screwing operation.

The end of the male component is of a radial dimension such as to impart to that end region a sufficient capability for resilient compression against the abutment means and also for resilient deformation in the flexural mode in the radial direction, in particular to accompany the corresponding resilient deformation phenomena in respect of the female component. Advantageously the section of the wall of the end region of the male tube is between 40 and 65 % of the section of the tube in a running portion.

Advantageously also, in order in particular to reduce the turbulence phenomena in the fluid flowing within the assembly arrangement, the diameters of the internal edge of the concave frustoconical abutment surface of the male component and of the internal edge of the convex frustoconical bearing surface of the female component are so dimensioned that, in the screwed-together and tightened state, the two diameters in question are substantially equal.

Advantageously, the screwthreads of the male and female components of the assembly arrangement according to the invention are produced in such a way that, after the male component has been screwed and tightened into the housing afforded by the female component, the thread tops of the female screwthread come into contact with a sufficient contact pressure with the thread bottoms of the male screwthread, at least over the major part of the screwthread length.

In an alternative configuration, the screwthreads of the male and female components can be produced in such a way that, after the male component has been screwed and tightened into the housing afforded by the female component, the thread tops of the male screwthread come into contact with a sufficient contact pressure with the thread bottoms of the female screwthread, at least over the major part of the screwthread length.

The following example and the accompanying drawings describe particular embodiments of the assembly arrangement according to the invention without limiting the latter.

FIG. 1 is a diagrammatic overall view in section in a plane containing the axis of the tubes, of the assembly by means of the arrangement according to the invention of metal tubes by means of sleeve;

FIG. 2 is a diagrammatic detail view in section in a plane containing the axis of the tube, of the end region of the male component of the arrangement according to the invention before the abutment surface is brought to bear against the bearing surface of the female component. FIG. 1 is a diagrammatic overall view in section in a half-plane containing the axis X1—X1 of a string of assembled tubes, of which only the ends of two thereof can be seen in the Figure. Disposed between the two tubes 1 and 2 is a short tube 3 which plays the part of a coupling sleeve. This Figure shows two identical and symmetrically disposed assembly arrangements 4 and 5 according to the invention, the first arrangement 4 involving the assembly of the male component 6 of the tube 1 and the female component 8 of the tube 3 and the second arrangement 5 involving the assembly of the male component 7 of the tube 2 with the female component 9 of the tube 3.

FIG. 2 is a view in section of half the end region of the male component 6 with an axis X1—X1.

The male component illustrated comprises a frustoconical screwthread diagrammatically indicated at 10, the straight lines 11 and 12 respectively indicating the lines through the bottom and the top of the thread. Those straight lines are the generatrices of frustoconical surfaces which have the same half-angle at the apex. The small-diameter end of the male screwthread is to be seen at 13 on a circumference centered at 14 on the axis X1—X1. The front end of that male component comprises a concave frustoconical abutment surface, with a generatrix, as indicated at 15, which is centered on the axis X1—X1. At the end of a screwing operation the surface 15 is capable of bearing against a corresponding convex frustoconical bearing surface 16 formed on a shoulder configuration 17 of the internal wall of the female component 8.

The convex frustoconical sealing surface 18 is connected to the abutment surface 15 at the front external edge 19. The convex frustoconical sealing surface 18 is capable of coming to bear sealingly by virtue of a metal-to-metal junction against a corresponding concave frustoconical sealing surface 20 of the female component 8.

In accordance with the invention the external edge 21 of the convex frustoconical sealing surface 18 is of a diameter such that the prolongation 22 of the generatrix 11 of the truncated cone which is tangential to the thread bottoms of the screwthread 10 of the male component 6 passes beyond the circle delimited by said external edge 21.

In order to control the guidance action in respect of the male component 6 during the introduction thereof into the housing afforded by the female component 8, and to prevent any possibility of jamming at the location of the sealing surface 18, the sealing surface 18 is prolonged in the direction of the end 13 of the screwthread 10 by a convex frustoconical guide surface 24. The generatrix of that surface 24 is parallel or substantially parallel to the prolongation 22 of the generatrix 11 which is tangential to the thread bottoms of the screwthread 10, the prolongation 22 of the generatrix 11 therefore being beyond said guide surface 24 with respect to the axis X1—X1. In the present embodiment the length of the portion of the generatrix of the guide surface 24 is at least equal to one-third of the total length of the generatrix of the external surface of the end region between the external edge 21 of the sealing surface 18 and the end 13 of the screwthread.

The half-angle at the apex of the sealing surface 18 is larger than the angle formed relative to the axis X1—X1 of the tube by the straight line 28 joining the end of the male screwthread at the point of smallest diameter 13 to the external edge 21 of the sealing surface 18.

That particular structure of the convex frustoconical sealing surface 18 of the male component and the guide surface 24 makes it possible virtually to eliminate the risk of damaging that surface by engagement with the screwthread of the female component 8, when the male component 6 is fitted into position in the housing afforded by the female component 8. It will be seen in fact that the straight line 28 which symbolically represents the possible male thread/female thread contact cannot come into contact with the sealing surface 18.

Preferably the radial distance d1 between the external edge 21 of the convex frustoconical sealing surface 18 and the prolongation 22 of the generatrix 11 is at least equal to 0.10 mm. Advantageously the distance d1 is between 0.10 and 0.50 mm. The half-angle at the apex of the convex frustoconical sealing surface 18 is advantageously between 2.862° and 30°.

The external edge 21 which is on the junction line between the sealing surface 18 and the guide surface 24 comprises a rounded configuration with a radius for example of 4 mm, which is also intended to eliminate the risks of the components becoming caught up together. Beyond the end 23 of the guide surface 24 the generatrix 25 of the external surface is substantially parallel to the axis X1—X1 and is then connected to the end 13 of the screwthread 10 by a junction radius 26.

In order further to improve the sealing integrity characteristics of the sealing effect produced by metal-metal contact, the annular end region 30 of the male component 6 between the front external edge 19 and the small-diameter end 13 of the screwthread 10 is of a length L1 and a section S1 which are so determined as to impart thereto a sufficient capacity for resilient deformation in respect of tension and compression in parallel relationship with the axis X1—X1 and also in a flexural mode radially with respect to that axis. For that purpose, the end region 30 is of a length L1 which is at least equal to 8mm for tubes with an outside diameter of from 120 to 250 mm. The mean section S1 of that region is generally between 40 and 65 % of the section of the tube 1 in a running portion and is advantageously greater than 45 % of said section.

Preferably the diameter of the internal wall of the end region 30 of the male component 6 is a little greater than the internal diameter of the tube in a running portion thereof and is so dimensioned that, in the screwed-in and tightened condition, the abutment surface 15 and the bearing surface 16 as well as the surfaces 18 and 20 being firmly applied against each other, the regions 27 and 29 are on diameters which are as close together as possible. That therefore limits at the maximum the turbulence phenomena due to the difference in level at 27-29 in the flowing fluid. It should be noted that, prior to the screwing operation, as shown in FIG. 2, the diameter D2 in line with the shoulder configuration 17 is smaller than D1 as well as the diameter at the front external edge 19 of the male abutment surface 15 is larger than the diameter of the junction region 31 between the female bearing surface 16 and the surface 20.

Prior to the screwing operation, the internal diameter D1 is generally larger than the internal diameter D of the tube 1 in a running portion thereof, as will be clear from the foregoing description.

It will be seen that the shape of the end of the male component makes it possible to reproducibly effect resilient compression of the end region 30 of the male component 6 at the end of a tightening operation, in particular at the location of the sealing contact between the sealing surfaces 18 and 20 by providing for the removal of the excess of lubricant in the course of the tightening operation, at the end of the screwing phase. In particular it is avoided to obstruct the solid particles contained in the lubricant of the "compound grease" type which is most frequently used. Generally the tightening effect produced causes the active flanks of the male and female threads to bear resiliently against each other.

The presence of a rounded configuration at 21 makes it possible to achieve, between the sealing surfaces 18 and 20, in the screwed-up and tightened condition, the optimum distribution of stress with a region of application from 21 which is clearly defined, which would not be the case if there were not a rounded configuration at 21. In addition the rounded configuration even more securely protects the surface 18 from any damage upon assembly of the arrangement by virtue of the position of the straight line 28.

It will be clearly seen that the design configuration of the assembly arrangement and in particular the shape of the end 30 of the male component, in accordance with the invention, makes it permanently possible upon assembly and tightening of the arrangement to avoid the creation of grease pressure in the screwing/tightening operation or to eliminate those pressures if they have developed, a flow path always existing for the grease, in particular in the region between 24 and 22.

The assembly arrangement described above is suitable primarily for all uses involving lines or strings of tubes. It is applied in particular to the strings of tubes used under very severe conditions in respect of mechanical stress, internal or external pressure, temperature and finally contact with corrosive fluids such as certain gases or mixtures of gases.

A very large number of modifications or adaptations may be made in the assembly arrangement according to the invention, without departing from the scope thereof. This assembly arrangement may also be the subject of various applications which also do not constitute a departure from the scope of the invention.

We claim:

CLAIMS

1. An assembly arrangement for tubes using frustoconical screwthreads comprising at one end of a tube a male component provided with an external male frustoconical screwthread and at one end of another tube a female component provided with a corresponding internal female screwthread, the front end of the male component having an abutment surface of concave frustoconical shape, which is rotationally symmetrical with respect to the axis of said component, capable of coming to bear at the end of a screwing operation against a corresponding convex frustoconical bearing surface formed on a shoulder configuration of the wall of the female component, the external edge of the concave frustoconical abutment surface being connected to a convex frustoconical sealing surface capable of coming to bear against a corresponding concave frustoconical surface of the female component which is connected to the convex frustoconical bearing surface of said component, characterised in that the external edge of the convex frustoconical sealing surface of the male component is of a diameter such that the prolongation of the generatrix of the truncated cone which is tangential to the thread bottoms of the screwthread of said male component passes beyond said external edge, the half-angle at the apex of the frustoconical sealing surface of the male end being in all cases greater than the angle formed with the axis of the tube by the straight line joining the end of the male strewthread at the point of small diameter to the external edge of the frustoconical sealing surface, and that the external surface of the end region of the male component which connects the external edge of the convex frustoconical sealing surface to the small-diameter end of the screwthread does not intersect the prolongation of the generatrix of the truncated cone which is tangential to the thread bottoms of the screwthread of the male component and comprises a portion of generatrix of said external surface forming a guide surface which is substantially parallel to the prolongation of the generatrix of the truncated cone which is tangential to the thread bottoms.

2. An assembly arrangement according to claim 1 characterised in that the portion of the generatrix of the guide surface of the end region of the male component is connected to the external edge of the convex frustoconical sealing surface by rounded configuration.

3. An assembly arrangement according to claim 1 characterised in that the generatrix of the external surface of the end region of the male component comprises beyond the portion corresponding to the frustoconical guide surface, a substantially cylindrical surface portion whose generatrix is parallel to the axis of the male component and is connected by a junction surface to the small-diameter end of the screwthread.

4. An assembly arrangement according to claim 1 characterised in that the male component is fixed with respect to a relatively long tube and the female component is fixed with respect to a short tube forming a coupling sleeve and provided at its second end with a female component.

5. An assembly arrangement according to claim 1 characterised in that the radial distance (d1) between the external edge of the convex frustoconical sealing surface of the male component and the prolongation of the generatrix of the truncated cone which is tangential to the thread bottoms of said component is at least equal to 0.10 mm.

6. An assembly arrangement according to claim 5 characterised in that the radial distance (d1) between the external edge of the convex frustoconical sealing surface of the male component and the prolongation of the generatrix of the truncated cone which is tangential to the thread bottoms is between 0.10 and 0.50 mm.

7. An assembly arrangement according to claim 1 characterised in that the length of the generatrix of the contact surface between the convex and concave frustoconical sealing surfaces, which is obtained after making up the screwed assembly of the male and female components, with the abutment surface bearing against the bearing surface, is at least equal to 2 mm.

8. An assembly arrangement according to claim 1 characterised in that the half-angle at the apex of the frustoconical sealing surfaces is between 2.862 and 30° and that the half-angle at the apex of the frustoconical abutment and bearing surfaces is between 70 and 85°.

9. An assembly arrangement according to claim 1 characterised in that the section of the wall of the end region of the male tube is between 40 and 65 % of the section of the tube in a running portion thereof.

* * * * *